United States Patent [19]
Lunazzi

[11] Patent Number: 5,192,172
[45] Date of Patent: Mar. 9, 1993

[54] GEAR HOBBING MACHINE WITH ARBORLESS SUPPORT FOR HOB

[75] Inventor: Alessandro Lunazzi, Bologna, Italy

[73] Assignee: Mikron S.p.A. Bologna, Bologna, Italy

[21] Appl. No.: 889,046

[22] Filed: May 26, 1992

[30] Foreign Application Priority Data

May 31, 1991 [IT] Italy ............................. B091A000189

[51] Int. Cl.⁵ .............................................. B21F 23/12
[52] U.S. Cl. ....................................... 409/11; 409/232
[58] Field of Search ................... 409/11, 12, 231, 232, 409/233, 234; 483/19, 31, 32

[56] References Cited

U.S. PATENT DOCUMENTS

| | | | |
|---|---|---|---|
| 3,076,387 | 2/1963 | Fabish | 409/11 |
| 4,015,510 | 4/1977 | Hodgson | 409/11 X |
| 4,111,098 | 9/1978 | Ainoura | |
| 4,137,822 | 2/1979 | Behnke | |
| 4,536,110 | 8/1985 | Farreil et al. | 409/234 X |

FOREIGN PATENT DOCUMENTS

| | | | |
|---|---|---|---|
| 211508 | 7/1984 | German Democratic Rep. | 409/11 |
| 112724 | 8/1980 | Japan | 409/11 |
| 89541 | 6/1982 | Japan | 409/11 |
| 124517 | 7/1984 | Japan | 409/11 |
| 44220 | 3/1985 | Japan | 409/11 |
| 146622 | 8/1985 | Japan | 409/11 |

Primary Examiner—William Briggs
Attorney, Agent, or Firm—Dvorak and Traub

[57] ABSTRACT

In a hobbing machine of the type with a pair of coaxial heads driving a hob supported between them, one of which capable of movement toward and away from the other and one affording a key positioned to engage a slot associated with the hob, the slot is incorporated directly into the hob, and each head carries an axially hollow alignment spigot with a stop collar, matched to and insertable in the axial bore of the hob to a depth determined by interaction of the relative collar with the end of the hob; equipping one of the heads with a coaxial tension rod insertable through the bore of the hob, and the other head with a clamping mechanism capable of gripping and tensioning the rod, the necessary rigidity is obtained without the use of an arbor.

5 Claims, 2 Drawing Sheets

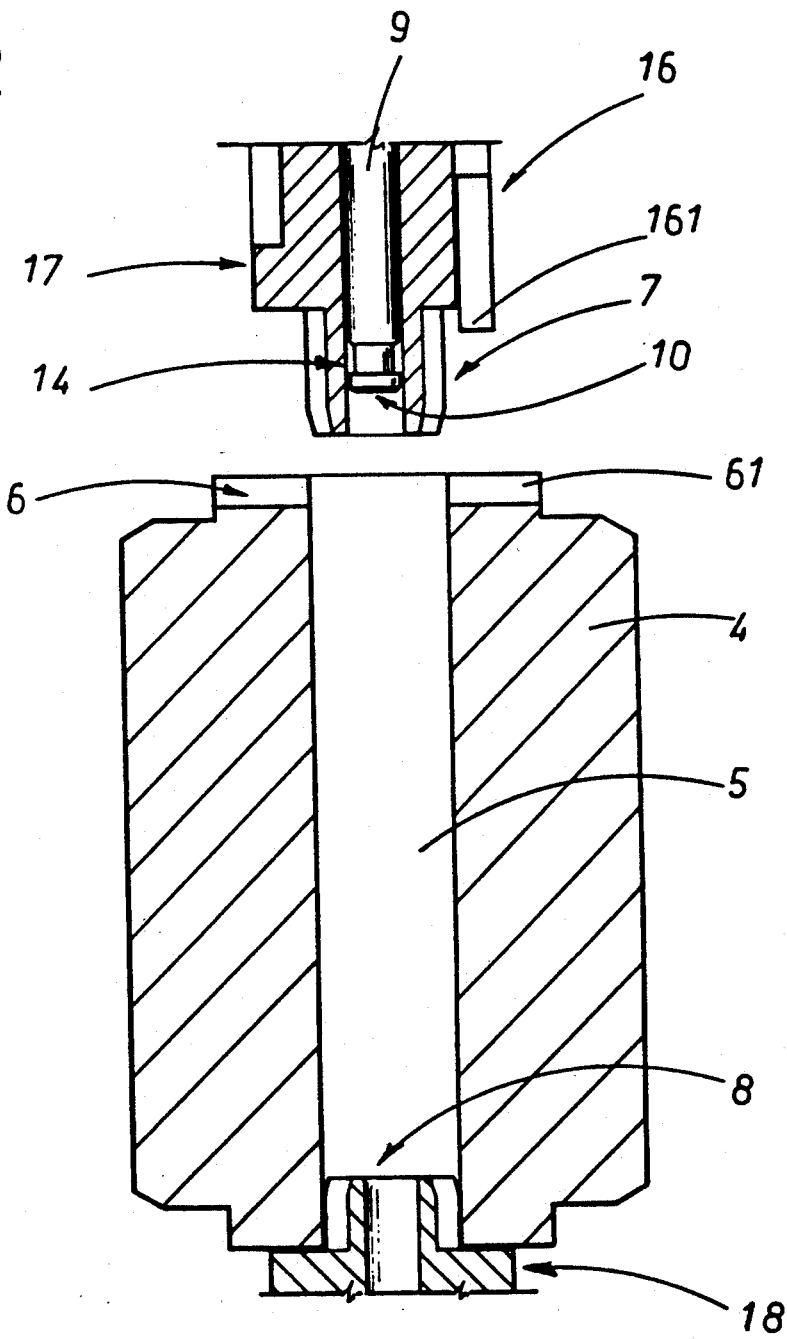

GEAR HOBBING MACHINE WITH ARBORLESS SUPPORT FOR HOB

BACKGROUND OF THE INVENTION

The present invention relates to a gear hobbing machine in which the hob is supported without the use of an arbor.

Hobbing type gear cutters consist generally, and essentially, in a pair of coaxial heads (spindle and support) by which the hob, an axially hollow cutting tool, is supported and set in motion. In conventional machines of the type in question, the hob is carried by an arbor passing coaxially through the bore of the hob and secured by a lock nut. The arbor is provided with means by which it is fastened to the heads of the machine, and means by which to determine the angular position of the hob, i.e. its timing, in relation to at least one of the heads. In most instances such timing means take the form of keys disposed longitudinally or transversely to the axis of the hob and associated or interacting with the arbor.

The importance of the mutual angular positioning of the hob and the two heads, crucial in ensuring that teeth are cut correctly, dictates almost inevitably that each individual hob be associated permanently with a relative arbor and, more especially, aligned with the timing key in readiness to operate. Such a provision has the effect of saving a considerable amount of time when the hob is changed, since the replacement tool is already timed when fitted, as well as allowing the adoption of a semi-automatic change facility.

The means by which the arbor is secured to the relative heads may consist in threaded fasteners or quick coupling elements, or a combination of both. Clearly, in the event that the fastening means are exclusively of threaded type, for example tapped axial holes in the butt ends of the arbor engaged by bolts passing through the heads, the change operation will be effected manually; where quick release couplings are incorporated, for example by embodying the arbor with shanked ends and equipping the heads with collets, the change operation can be essentially automatic.

Whichever of the above solutions is adopted, the fundamental need to fit each hob with a respective arbor represents a notable cost, besides involving machine operatives in an additional laborious task, especially when replacing hobs of somewhat large dimensions.

Accordingly, the object of the present invention is to embody a hobbing machine in which successive hobs can be supported and rotated correctly without the constraint that each hob should be associated permanently with a relative arbor.

SUMMARY OF THE INVENTION

The stated object is realized, in a gear hobbing machine of the type comprising a pair of coaxial heads between and by which an axially hollow hob is supported coaxially and set in rotation about the common axis of the heads, of which one is capable of movement along its own axis toward and away from the other; also first timing means associated with one of the two heads and interacting with second timing means associated with the hob.

In the machine disclosed, the second timing means are incorporated directly into the hob, and each of the two heads affords an axially hollow alignment spigot with a relative stop collar, insertable to a matching fit in the axial bore of the hob to a depth at which the collar enters into contact with the hob; advantageously, moreover, at least one of the two heads is equipped with a coaxial tension rod insertable through at least one of the spigots and through the hob in such a way as to allow its engagement and retention by gripping and tensioning means, associated with the remaining head, of which the purpose is to subject the rod to a tensile stress and thus cause a force of axial compression to be applied through the spigots to the hob.

BRIEF DESCRIPTION OF THE DRAWINGS

The invention will now be described in detail, by way of example, with the aid of the accompanying drawings, in which:

FIG. 2 illustrates the hob and the components by which it is directly supported and set in motion, viewed in side elevation and on larger scale, and in a different configuration to that of FIG. 1.

DESCRIPTION OF THE PREFERRED EMBODIMENTS

Figure 1:
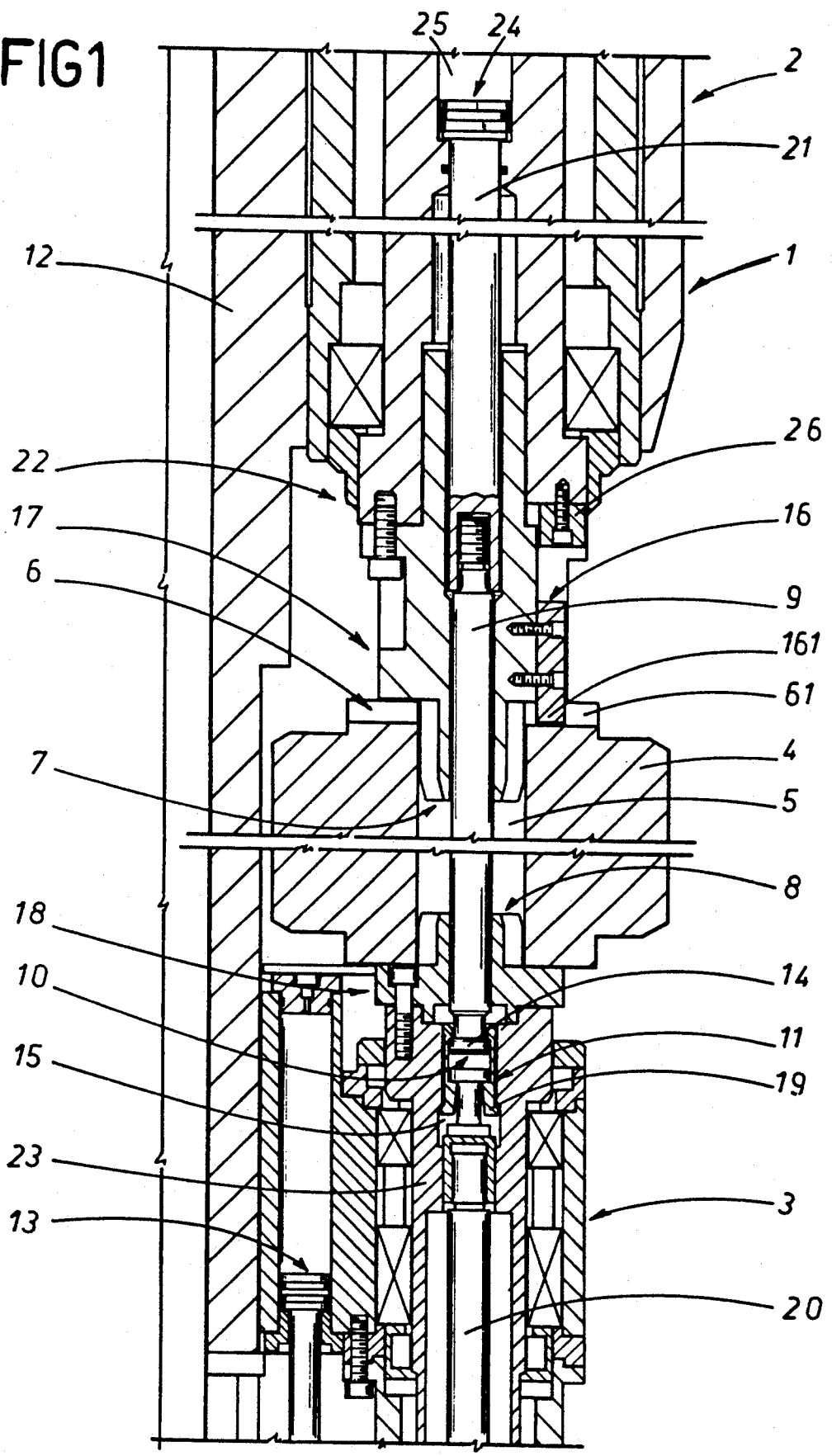
FIG. 1 shows the part of the machine according to the invention which is occupied by the hob, viewed in side elevation with certain parts omitted and certain shown in section better to reveal others.

With reference to the drawings, 1 denotes a gear cutting machine according to the present invention, considered in its entirety; such a machine is of the type comprising a pair of coaxial heads 2 and 3 by which the cutting tool, a hob 4, is carried and set in motion. The two heads 2 and 3 are supported in conventional manner by a horizontal bed or by a vertical post 12, as in the example of FIG. 1, and in such a way that one head 3, occupying the lower position in FIG. 1, is capable of movement along its own axis toward and away from the opposite head 2, brought about by actuator means consisting in a fluid power cylinder 13. The hob 4 is essentially cylindrical and hollow in embodiment, with an axial bore 5, and carries second timing means 6 that are designed to interact with first timing means 16 afforded by the corresponding head 2.

According to the invention, the second timing means 6 are incorporated directly into the hob 4, and the heads 2 and 3 carry respective alignment spigots 7 and 8 each with a relative stop collar 17 and 18. The two spigots 7 and 8 are matched to the axial bore 5 of the hob 4, and insertable therein to a depth determined by the location of the collars 17 and 18 against the corresponding ends of the hob 4. Each spigot 7 and 8 affords an axial bore coaxial with that of the hob 4 and serving to accommodate a tension rod 9 associated with one of the two heads (that denoted 2, in the example of FIG. 1); more exactly, the rod 9 is insertable through at least one of the spigots 7 or 8 and through the hob 4 at least in part, and designed to be restrained and tensioned by respective means 11 associated with the remaining head 3.

In the particular example illustrated, the second timing means 6 take the form of a diametral slot 61 incorporated directly into one end of the hob 4, and the tension rod 9 is capable of axial movement between two limit positions, the one substantially of retraction into the relative head 2, thereby enabling the introduction of a hob 4 between the heads 2 and 3, the other of insertion through both spigots 7 and 8 and the hob 4.

The end 10 of the rod 9 inserted through the hob 4 is embodied with a button head 14, which can be gripped automatically by the tensioning means 11. Such means 11 consist in a collet 19 occupying an axial bore 15 in the moving head 3 and associated with a reciprocating rod, denoted 20, in such a way as to spread and close in conventional manner by interaction with the surface of the bore 15 when the rod 20 is moved back and forth.

The collet 19 and the tension rod 9 are supported by respective elements denoted 22 and 23 which form integral parts of the corresponding heads 2 and 3 and are rotatable in relation both to the heads and to the post 12; it is to these same two elements 22 and 23 that the two relative spigots 7 and 8 are mounted. The first timing means 16 are associated with the spigot 7 of the respective head 2, and embodied as a frontal key or dog 161 insertable to a matched fit in the diametral slot 61 afforded by the hob 4. The two spigots 7 and 8 are associated interchangeably with the support elements 22 and 23 so as to allow their replacement according to the size of the axial bore 5 presented by the hob 4. Also shown in FIG. 1 are timing and transmission means interposed between the spigot denoted 7 and the relative support element 22, consisting in a catch pin 26 secured to the element.

The tension rod 9 is rectilinear and associated coaxially and removably, for example by means of screw threads, with one end of a piston rod 21 of which the piston 24, carried by the remaining end, is slidably accommodated to a fluid-tight fit in an axial bore 25 afforded by the respective support element 22. The bore 25 is connected to a source of fluid power (not illustrated) by means of which the piston 24, hence the rod 21, can be invested with movement in one direction or the other exactly in the manner of a hydraulic or pneumatic cylinder, with the support element 22 providing the barrel. The support element 22 is connected mechanically in conventional manner to drive means not illustrated in the drawings, and set in rotation about its own axis, hence about the axis of the hob 4, during the operation of the machine.

To replace the hob 4 in a machine according to the invention, it suffices first to open the collet 19, thereby freeing the button 14 of the tension rod 9, and distance the rod 9 from the moving head 3. The hob 4 is thus released from the spigots 7 and 8 and can be removed to permit its replacement with one having dissimilar specifications. In the event that the bore 5 of the replacement hob 4 is identical in diameter to that of the discarded hob, the new hob can be positioned immediately between the heads 2 and 3, and the moving head 3 then directed toward the fixed head 2 in such a way that the spigots 7 and 8 are inserted into the bore 5 and firm contact is established between the collars 17 and 18 and the hob ends. In practice, the support element 22 associated with the fixed head 2 may need to be rotated before the collars 17 and 18 are brought into contact with the hob 4, in order to align the key 161 and the slot 61. The piston rod 21 is now extended to direct the tension rod 9 through the spigots 7 and 8 and the hob 4, whereupon the collet 19 can be tightened. Finally the tensioning means 11 are activated, thereby exerting a tensile force on the rod 9 in such a way that the spigots 7 and 8 and the collars 17 and 18, already in contact with the hob 4, are drawn tighter together.

This last step is especially advantageous in that it invests the supporting structure of the hob 4 with additional rigidity; as a result of the force generated by the tensioning means 11, in effect, the moving head 3 and the fixed head 2 are drawn closer together and the hob 4 is therefore clamped more firmly between them. This means, in short, applied direct to the hob 4, unlike in conventional machines where clamping forces are applied to the arbor carrying the hob.

Another advantage of the present invention is the certainty of correct timing between the hob 4 and the means by which it is set in rotation, deriving from the fact that one of the timing components is incorporated directly into the hob itself.

What is claimed:
1. A gear hobbing machine, comprising:
   a pair of coaxial heads, the first head capable of movement along its own axis toward and away from the second head, between and by which a hob having an axial bore is supported coaxially, said hob set in rotation bout the common axis of the coaxial heads;
   a first timing member disposed on one of the two heads;
   a second timing member disposed on the hob and interacting with the first timing member;
   a pair of axially hollow alignment spigots with respective stop collars, associated one with each of the heads and said spigots insertable in the axial bore of the hob to a depth at which the collars engage the hob;
   a tension rod coaxially disposed in at least one of the heads, and having a free end insertable through both of the spigots and through the hob, and
   gripping and tensioning means for engaging and restraining the tension rod to cause a force of axial compression to be applied through the spigots to the hob, said gripping and tensioning means disposed on the remaining head.

2. The hobbing machine as in claim 1 wherein the tension rod is capable of movement between a first limit position of retraction within the head in which the rod is disposed, allowing the insertion of the hob between the coaxial heads, and a second limit position of insertion through the spigot of the head in which the rod is disposed, and through the hob at least in part, in which the end of the rod farthest from the head in which the rod is disposed can be restrained and a tensile stress applied to the rod itself by the gripping and tensioning means.

3. The hobbing machine as in claim 1 wherein the head in which the tension rod is disposed is fixed and the tension rod is capable of axial movement between two limit positions separated by a distance greater than the axial length of the hob, and the head in which the gripping and tensioning means are disposed is movable.

4. The hobbing machine as in claim 1 wherein the two alignment spigots are removably disposed on the coaxial heads according to the diameter presented by the axial bore of the hob.

5. The hobbing machine as in claim 1 wherein the second timing member comprises a diametral slot disposed in one end of the hob, and the first timing member comprises a frontal key or dog disposed on the spigot of the respective head.

* * * * *